United States Patent [19]
Roth et al.

[11] 3,768,518
[45] Oct. 30, 1973

[54] FLUID TRANSFER VALVE
[76] Inventors: Verlon C. Roth, 2279 Trinway, Simi Valley; Arden J. Roth, 2279 Trinway Ave., Simi, both of Calif. 93065
[22] Filed: Mar. 1, 1971
[21] Appl. No.: 119,464

[52] U.S. Cl......... 137/625.66, 137/625.68, 251/325
[51] Int. Cl...................... F16k 11/07, F16k 31/383
[58] Field of Search.......................... 251/61.3, 32.5; 137/625.66, 625.68, 625.6

[56] References Cited
UNITED STATES PATENTS

| 785,137 | 3/1905 | Westbrook | 137/625.66 |
|---|---|---|---|
| 973,663 | 10/1910 | Jacobs | 251/325 |
| 2,644,481 | 7/1953 | Perlman | 251/325 X |
| 1,785,289 | 12/1930 | Tucker | 137/625.68 |
| 2,705,020 | 3/1955 | Frantz | 137/625.66 |
| 3,107,693 | 10/1963 | Puster et al. | 137/625.66 |
| 3,363,412 | 1/1968 | Fischer et al. | 251/61.3 X |
| 3,545,479 | 12/1970 | Loe | 137/625.68 X |

FOREIGN PATENTS OR APPLICATIONS

| 1,078,126 | 5/1954 | France | 251/325 |
|---|---|---|---|

*Primary Examiner*—Henry T. Klinksiek
*Attorney*—Christie, Parker & Hale

[57] ABSTRACT

A fluid transfer valve has a housing with a hollow interior, and a tubular piston with a passage through it movably disposed within the hollow interior. The piston is normally maintained in a closed position sealed to the interior of the housing to prevent fluid communication between an inlet in the housing and the passage through the piston. The piston slides to an open position in which fluid under pressure flows from the inlet through the passage in the piston. When the piston moves to its open position, the fluid delivered to the passage through the piston flows out an outlet in the housing.

9 Claims, 2 Drawing Figures

FIG_1

FLUID TRANSFER VALVE

BACKGROUND OF THE INVENTION

This invention relates to a valve for controlling fluid flow.

In the past, a variety of control valves have been provided for opening and closing lines carrying fluid under pressure. Such control valves are used, for example, on industrial rinse showers, and for periodically filling containers and the like. It is often the case that such control valves are hand-operated only, thereby requiring a workman to periodically stop what he is doing to free his hands so he can operate the valve. Thus, there is a need for a fluid control valve which may be operated by a workman's foot, or arm, for example, to allow him complete freedom of hand movement when operating the valve.

SUMMARY OF THE INVENTION

Briefly, this invention provides a fluid transfer valve having a housing with a hollow interior, and an elongated tubular piston having a passage through it slidably disposed within the hollow interior. The housing has a fluid inlet and a fluid outlet communicating with the piston. A seal formed between the interior of the housing and the piston prevents fluid communication between the inlet and the passage through the piston. The piston is slidable to an open position providing fluid communication between the inlet and the passage through the piston. When the piston is in its open position, fluid communication is provided between the outlet and the passage through the piston, so that fluid under pressure flows from the inlet, through the passage in the piston, and out the outlet.

In a preferred embodiment of the invention, inlet pressure acts on the side wall of the piston when the piston is in its closed position. This side pressure tends to maintain the piston in its closed position. When the piston is moved to its open position, an inlet port in the side wall of the piston moves into communication with the inlet of the valve to permit fluid to flow through the interior of the piston. The inlet pressure acting at the side of the piston has little effect on the pressure required to open and close the piston.

The valve of this invention may be used in many industrial applications where a workman's hands are not free to turn a valve to open or close it. The present valve may be opened or closed simply by applying foot, hand, or knee pressure, or the like to slide the piston between its open and closed positions. The valve is simple in construction so it may be manufactured at a relatively low cost, as well as being compact and easy to operate. The simple construction of the valve permits it to be easily converted between manual operation and actuation by air pressure or the like. The valve has few moving parts which may be made from injection molded plastic material which permits the valve to be used with corrosive liquids.

DETAILED DESCRIPTION OF THE PREFERRED EMBODIMENTS

Figure 1:
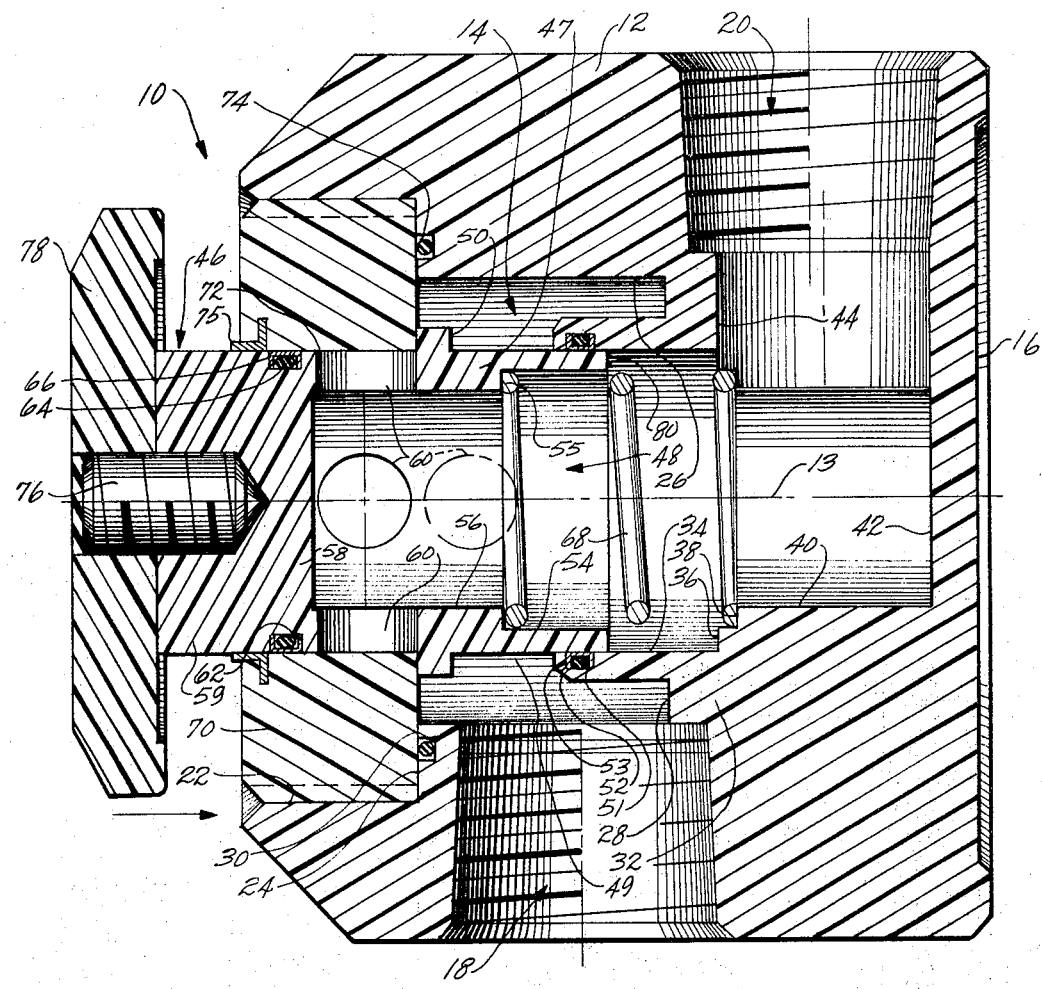
FIG. 1 is a sectional elevation view showing a fluid transfer valve.

A two-way fluid transfer valve 10 includes a cylindrical housing 12 having a longitudinal centerline or axis 13 and hollow interior 14 in the form of a stepped bore centered on axis 13. The stepped bore extends through the top of the housing down to a point spaced slightly above a bottom surface 16 of the housing. An internally threaded inlet port 18 extends through an intermediate portion of the housing side wall and opens into the hollow interior 14. An outlet port 20 extends through a lower portion of the housing side wall on the side of the housing opposite inlet port 18, and opens into the lower portion of the hollow interior.

The hollow interior is defined in part by a relatively large internally threaded opening 22 in the top of the housing, an inwardly extending annular shoulder 24 at the bottom of opening 22, a straight bore 26 extending downwardly from shoulder 24, and an angular ridge 28 at the bottom of bore 26. Shoulder 24 has a downwardly extending annular seat 30. Inlet port 18 opens through a portion of bore 26.

An annular ring or sleeve 32 extends upwardly into the hollow interior of bore 26. Sleeve 32 has a central straight bore 34 extending downwardly to define an inwardly projection annular ridge 36 at its bottom. Ridge 36 has an annular seat 38 formed in its inner periphery. A straight bore 40 extends downwardly from annular seat 38 to define a flat bottom surface 42 of hollow interior 14. A laterally extending straight bore 44 provides a passage from outlet port 20 to bore 40. The bottoms of outlet port 20 and lateral bore 44 are flush with bottom surface 42.

An elongated tubular piston 46 having a cylindrical body 47 with a downwardly opening hollow interior 48 is slidably disposed within the upper portion of hollow interior 14. The cylindrical body 47 of piston 46 defines elongated outer side wall surfaces 49 which extend parallel to axis 13 of housing 12. A lip 50 extends outwardly from an intermediate portion of the cylindrical outer surface 49 of the piston. The lower portion of the piston is fitted within the upper portion of bore 34 in sleeve 32. An inwardly extending annular seat 51 spans the inner periphery of sleeve 32. A resilient inner O-ring 52, preferably made of rubber, is seated in seat 51, and an outer low-friction O-ring seal 53, preferably made of Teflon, is fitted in seat 51 and covers O-ring 52. O-ring seal 53 provides a fluid tight seal between the lower portion of the piston and the inner wall of the sleeve, and also provides a smooth bearing surface which permits the piston to slide smoothly within the sleeve.

The hollow interior 48 of the piston 46 is a stepped bore defined by a straight bore 54 extending upwardly from the lower end of the piston to an inwardly extending annular shoulder 55, and a straight bore 56 extending upwardly from shoulder 55 to an upper interior surface 58 at the top of hollow interior 48. A solid cap 59 closes off the upper portion of the piston.

A plurality of laterally spaced apart fluid flow ports 60 extend through the side wall of the piston 46 above lip 50 to provide fluid flow passages from the outside of the piston to its hollow interior 48. Preferably, six ports span the circumference of the piston, although a different number of ports may be provided if desired (only three ports 60 can be seen in FIG. 1).

Upper cap 59 of the piston has an inwardly extending annular seat 62 formed in its outer periphery at a point slightly above ports 60. Seat 62 carries a seal formed by a resilient inner O-ring 64, preferably made of rubber, and an outer O-ring seal 66, preferably made of Teflon, fitted in seat 62 over O-ring 64.

An upright coil spring 68 is seated on seat 38 in the hollow interior of housing 12. The upper portion of the spring 68 extends into the lower portion of piston 46, with the upper end of the spring 68 bearing against seat 55 in the interior of the piston 46.

An annular collar 70 having an externally threaded outer periphery screws into the internally threaded opening 22 in the upper portion of housing 12. Collar 70 has a central straight bore 72 which fits over the cylindrical upper portion of piston 46. An O-ring seal 74 disposed within seat 30 provides a fluid tight seal between shoulder 24 and the lower surface of collar 70 when the collar is screwed in place and tightened against shoulder 24. Teflon O-ring seal 66 provides a fluid tight seal between bore 72 of collar 70 and the cylindrical outer surface of piston 46. O-ring seal 66 also provides a low-friction surface which permits piston 46 to slide smoothly within bore 72 of collar 70. An annular wiper ring 75 is fitted within a slot around the upper end of bore 72 of collar 70. The wiper ring spans the inner periphery of bore 72. The wiper ring 75 is preferably made of a low-friction material, such as Teflon, and bears against the sliding outer surface of the piston 46 to provide means for preventing foreign matter from entering the upper portion of the valve housing.

An upright, externally threaded elongated fastener 76 is screwed into the center of cap 59 of piston 46. A shank portion of the fatener protrudes above the upper surface of cap 59 to receive a flat, circular pushbutton 78 at the top of the valve. Pushbutton 78 extends laterally outwardly from the side wall of the upper portion of the piston to provide a relatively large area of contact for the foot, arm, or the like, of the person actuating the valve.

In use, an inlet line (not shown) is coupled to inlet port 18. Spring 68 maintains piston 46 in a normally closed position shown in FIG. 1. In this position, the upper surface of lip 50 is urged against the lower surface of collar 70. Thus, ports 60 of the piston 46, which are above lip 50, are maintained within the interior of bore 72 of collar 70. The engagement of lip 50 with collar 70 provides a seal which prevents fluid delivered through the inlet port 18 from passing into ports 60. O-ring seal 53, which provides a fluid-tight seal between sleeve 32 and the lower portion of piston 46, prevents fluid delivered to inlet port 18 from passing through the interior of the housing to outlet port 20. Thus, the valve is closed when the piston is in the position shown in FIG. 1, and fluid delivered to inlet port 18 does not pass through outlet port 20. Inlet pressure through inlet port 18 acts on outer wall surface 49 of piston 46 and therefore does not tend to open the valve.

The valve is opened by applying downward pressure to pushbutton 78 in the direction of the arrow shown in FIG. 1. The piston 46, being rigidly connected to the pushbutton 78, slides downwardly within sleeve 32 parallel to axis 13 when such pressure is applied. Downward movement of the piston compresses spring 68, with annular lower edge 80 of the piston seating on shoulder 36 when the piston is pushed its full length of travel. Generally, the valve is used in applications in which foot, hand, or knee pressure is applied to the pushbutton 78 to open the valve. When the valve is pushed to its open position, it remains open until pressure is removed from the pushbutton 78. When the valve is in its open position seated on shoulder 36, ports 60 of piston 46 are lowered to a position (shown in phantom line in FIG. 1) below the lower surface of collar 70, thereby permitting fluid under pressure to flow from inlet port 18, through ports 60 to the interior of piston 46, and out outlet port 20. Thus, the valve controls the flow of fluid from the inlet line to an outlet line (not shown) coupled to outlet port 20. Typical applications of the valve may be as a control valve for filling containers or providing industrial rinse showers. Flow through port 18 is normal to the longitudinal axis 13 of the piston and thereby allows easy actuation of the piston.

The valve is shut off simply by releasing the pressure on pushbutton 78. When the pressure is released, spring 68 urges the piston upwardly to its closed position shown in FIG. 1. Lip 50 acts as a stop by abutting against the bottom surface of collar 70 to limit upward movement of the piston 46. The back pressure of the fluid flowing out of port 20 aids in urging the piston to its closed position.

The simple construction of the valve and its small number of parts permit the valve to be manufactured at a relatively low cost. Preferably, the valve housing 12, collar 70, pushbuttons 78, and piston 46 are made of injection molded plastic material, preferably polyvinyl chloride. Thus, the valve is relatively light in weight, and capable of being used with corrosive fluids such as acids. Spring 68 also may be coated with Teflon if the valve is used with corrosive liquids.

Figure 2:
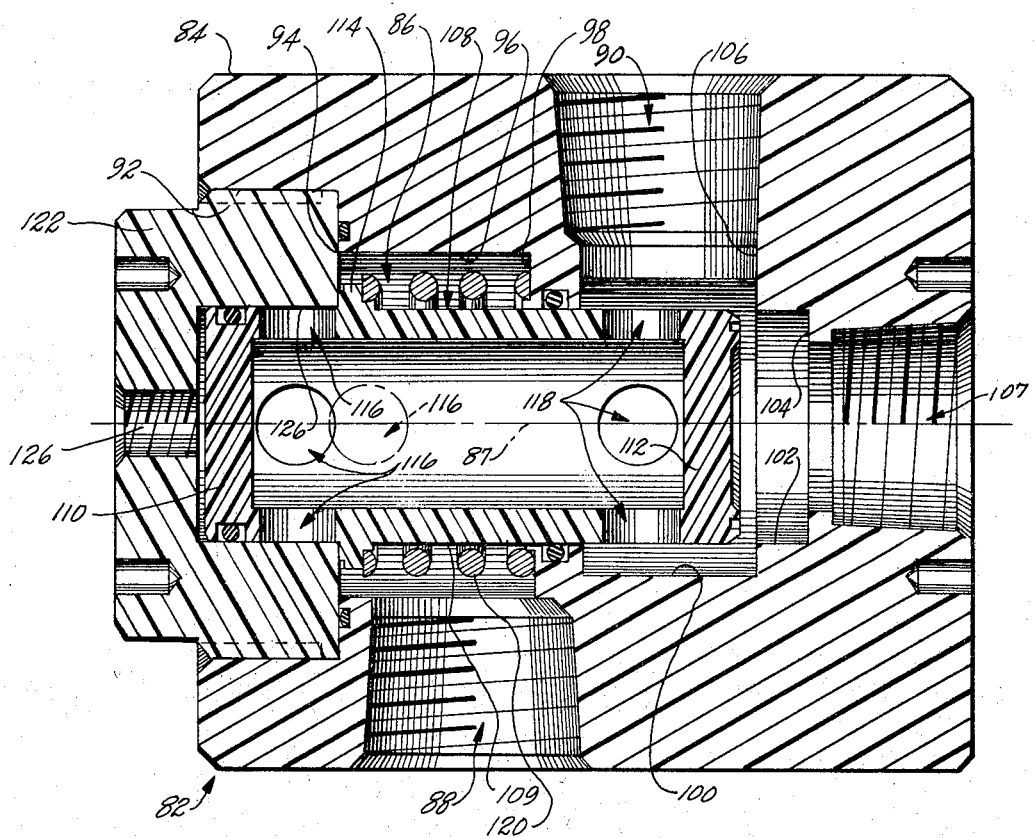
FIG. 2 is a sectional elevation view showing an alternative embodiment of the valve shown in FIG. 1.

FIG. 2 shows a three-way fluid transfer valve 82 which is an alternative embodiment of the valve shown in FIG. 1. Valve 82 is similar to valve 10 in many respects. For example, it has a cylindrical housing 84 with a hollow interior 86 in the form of a stepped bore centered on the longitudinal centerline or axis 87 of housing 84, an inlet port 88 extending through a side wall of the housing and opening into hollow interior 86, and an outlet port 90 extending through the side wall of housing 84 on the side of the housing opposite inlet port 88 and opening into the lower portion of hollow interior 86.

Hollow interior 86 defines a relatively large externally threaded opening 92 at the top of the valve housing, an inwardly projecting annular shoulder 94 below opening 92, a straight bore 96 extending downwardly from shoulder 94, an inwardly projecting annular ridge 98 at the bottom of bore 96, an enlarged straight bore 100 below ridge 98, a straight bore 102 below bore 100 having a smaller diameter than bore 100, and an inwardly projecting annular ridge 104 at the bottom of bore 100. A laterally extending bore 106 connects outlet port 90 with bore 100 in the interior of the housing. An internally threaded exhaust port 107 extends upwardly from the center of the bottom surface of the valve housing and opens into the lower portion of hollow interior 86 at ridge 104.

An upright elongated tubular piston 108, which is centered on axis 87, is slidably disposed within hollow interior 86. Piston 108 has a cylindrical body with an outer wall surface 109 parallel to axis 87. A cap 110 covers the upper end of piston 108, and a cap 112 covers the lower end of the piston. An outwardly projecting lip 114 spans the outer periphery of an intermediate portion of the piston. A plurality of laterally spaced apart upper ports 116 extend through the upper portion of the piston side wall above lip 114. A plurality of laterally spaced apart lower ports 118 extend through the lower portion of the piston side wall. When the piston is in its closed position shown in FIG. 2, lower ports 118 are laterally aligned with outlet port 90.

An upright coil spring 120 is fitted around the lower portion of piston 108. The upper portion of spring 120 rests against the bottom surface of lip 114 of the piston. The bottom portion of the spring rests on the upper surface of ridge 98. Thus, the spring suspends the piston within the hollow interior of the housing and under force permits the piston to move from the closed position shown in FIG. 1 downwardly to an open position in which the bottom of the piston rests on ridge 104.

An externally threaded cylindrical collar 122 screws into opening 92 at the top of the valve housing. The lower portion of the collar has a centrally disposed, downwardly opening bore 124 which fits over the upper portion of piston 108. When collar 122 is screwed tightly against shoulder 94, the upper surface of lip 114 of the piston abuts against the lower surface of the collar, and upper portions 116 of the piston are maintained within the interior of bore 124 of collar 122 to prevent fluid entering inlet port 88 from being transmitted through the interior of the piston.

An internally threaded bore 126 extends down through the center of collar 122, opening into the upper portion of bore 124. Bore 126 is adapted for connection with an inlet line (not shown) which transmits compressed gas to the space above the top of the piston. Thus, when valve 82 is to be opened, the inlet line is opened to force compressed gas against the top of the piston and push the piston downwardly within hollow interior 86 to its open position seated on ridge 104. Downward movement of the piston to its open position permits fluid under pressure to flow from inlet port 88, through upper ports 116 to the interior of the piston, and out lower ports 118 and outlet port 90. During the time the piston remains in its open position, lower cap 112 is seated on ridge 104 and thereby prevents fluid from passing through exhaust port 107. When the gas pressure is released to shut off the valve, the piston returns to its closed position shown in FIG. 2 under the action of spring 120, and the fluid remaining in the outlet line and the interior of the piston flows out exhaust port 107.

The valves shown in the drawings may be modified in various ways without departing from the scope of the invention. For example, the top of the piston in two-way valve 10 may be modified to make the piston movable under gas pressure in a similar manner as that shown for valve 82. The piston of three-way valve 82 may be modified to make the piston manually operated similar to that shown for valve 10. Moreover, the positions of the coil springs may be changed, such as by placing coil spring 68 between the lower surface of pushbutton 78 and the upper surface of collar 70.

I claim:

1. A fluid transfer valve comprising a housing having a hollow interior; an elongated tubular piston having a passage therethrough, an outwardly extending shoulder spanning the outer periphery of an intermediate portion of the piston, the piston defining an upper portion above the shoulder and a lower portion below the shoulder, an inlet port extending through the upper portion of the piston and opening into the passage through the piston, and an outlet port extending through the lower portion of the piston and opening into the passage through the piston, the piston being slidably disposed within the hollow interior to travel between a closed position and an open position; fluid inlet means in the housing communicating with the piston, the shoulder on the piston being maintained in sealing contact with the interior of the housing to prevent fluid communication between the fluid inlet means and the piston inlet port when the piston is in its closed position; fluid outlet means in the housing communicating with the piston; and means extending to a point outside the housing and coupled to the piston for slidably moving the piston to its open position for providing fluid communication between the fluid inlet means and the piston inlet port so that fluid under pressure can flow from the fluid inlet means, through the passage in the piston and the piston outlet port, and out the fluid outlet means.

2. Apparatus according to claim 1 including fluid exhaust means in the housing for communicating with the hollow interior of the housing, the fluid exhaust means being located so it is in fluid communication with the fluid outlet means as the piston travels from its open position to its closed position.

3. Apparatus according to claim 2 including a shoulder formed in the interior of the housing between the piston outlet and the fluid exhaust means, said shoulder being located so that the lower portion of the piston can be maintained in sealing contact with the shoulder for preventing fluid communication between the fluid exhaust means and the piston outlet when the piston is in its open position to prevent communication between the fluid outlet means and the fluid exhaust means.

4. Apparatus according to claim 3 in which the piston has an exterior side wall, and including first and second seals extending between the piston side wall and the hollow interior of the housing and positioned on opposite sides of the fluid inlet port for confining fluid in the fluid inlet port at the piston side wall when the piston is in its closed position.

5. Apparatus according to claim 4 in which the piston inlet and outlet ports are positioned on opposite sides of the first and second seals, respectively, remote from the fluid inlet means.

6. Apparatus according to claim 1 including spring biasing means cooperating between the interior of the housing and the piston for urging the shoulder against the interior of the housing to maintain the shoulder in sealing contact with the interior of the housing.

7. Apparatus according to claim 6 including a shoulder in the interior of the housing between the upper portion of the piston and the fluid inlet means, the spring biasing means being operative to maintain the shoulder of the piston in contact with the shoulder of the housing when the piston is in its closed position.

8. Apparatus according to claim 1 in which the piston has an exterior side wall, and including first and second seals extending between the piston side wall and the hollow interior of the housing and positioned on opposite sides of the fluid inlet port confining fluid in the fluid inlet port at the piston side wall when the piston is in its closed position.

9. Apparatus according to claim 8 in which the piston inlet and outlet ports are positioned on opposite sides of the first and second seals, respectively, remote from the fluid inlet means.

\* \* \* \* \*